(12) United States Patent
Welsh et al.

(10) Patent No.: US 6,469,267 B1
(45) Date of Patent: Oct. 22, 2002

(54) SWITCH WITH AT LEAST ONE FLEXIBLE CONDUCTIVE MEMBER

(75) Inventors: Laurence M. Welsh, San Carlos, CA (US); Leonard H. Radzilowski, Mountain View, CA (US); Tom J. A. M. Cloots, Londerzeel (BE); Bavo A. A. Muys, Eppegem (BE); Peter J. M. Willaert, Destelbergen (BE)

(73) Assignee: ELO Touchsystems, Inc., Freemont, CA (US)

( * ) Notice: Subject to any disclaimer, the term of this patent is extended or adjusted under 35 U.S.C. 154(b) by 0 days.

(21) Appl. No.: 09/614,290

(22) Filed: Jul. 12, 2000

(51) Int. Cl.[7] ................................................. H01H 1/02
(52) U.S. Cl. ....................................... 200/512; 345/173
(58) Field of Search ........................... 345/173; 200/512, 200/262

(56) References Cited

U.S. PATENT DOCUMENTS

| | | | |
|---|---|---|---|
| 4,306,110 A | 12/1981 | Nelson et al. ................ 178/18 |
| 5,220,136 A | 6/1993 | Kent ........................... 178/18 |
| 5,300,575 A | 4/1994 | Jonas et al. .................. 525/186 |
| 5,438,168 A | 8/1995 | Wolfe et al. .................. 178/20 |
| 5,463,056 A | 10/1995 | Jonas .......................... 544/350 |
| 5,541,370 A | 7/1996 | Matsuda et al. ............. 178/18 |
| 5,589,857 A | 12/1996 | Tanahashi et al. ........... 345/174 |
| 5,766,515 A | 6/1998 | Jonas et al. .................. 252/500 |
| 5,776,373 A | 7/1998 | Bergmann et al. ........ 252/518.1 |
| 5,818,430 A | 10/1998 | Heiser ......................... 345/174 |
| 5,844,175 A | 12/1998 | Nakanishi et al. ........ 178/18.03 |
| 5,851,642 A | 12/1998 | Sauvinet et al. ............ 428/212 |
| 6,042,752 A | 3/2000 | Mitsui ...................... 252/520.1 |

OTHER PUBLICATIONS

Tahon et al., Flexible Polymer Laminates with Excellent Gas–Barrier Properties Bollens, Antistatic and Conductive Polyester Films.

Cloots et al., Comparison of a coated intrinsically conductive polymer (Poly–3,4–ehtylenedioxythiophene) electrode (ORGACON EL) with a conventional ITO–electrode for thick film electroluminescent device applications.

*Primary Examiner*—Renee Luebke
(74) *Attorney, Agent, or Firm*—Brinks Hofer Gilson & Lione; Dwayne L. Bentley

(57) ABSTRACT

A switch comprises two substrates coated with conductive elements opposed to each other across a gap. At least one of the conductive elements comprises an intrinsically conductive polymer. The switch completes an electrical circuit when one of substrates is pressed toward the other of the substrates and the two conductive elements touch. The polarity applied to the intrinsically conductive polymer coating is, preferably, negative. The voltage applied to the electrical circuit, is, preferably, less than five volts; more preferably, the voltage applied to the electrical circuit is less than three volts; even more preferably, the voltage applied to the electrical circuit is less than one volt.

20 Claims, 10 Drawing Sheets

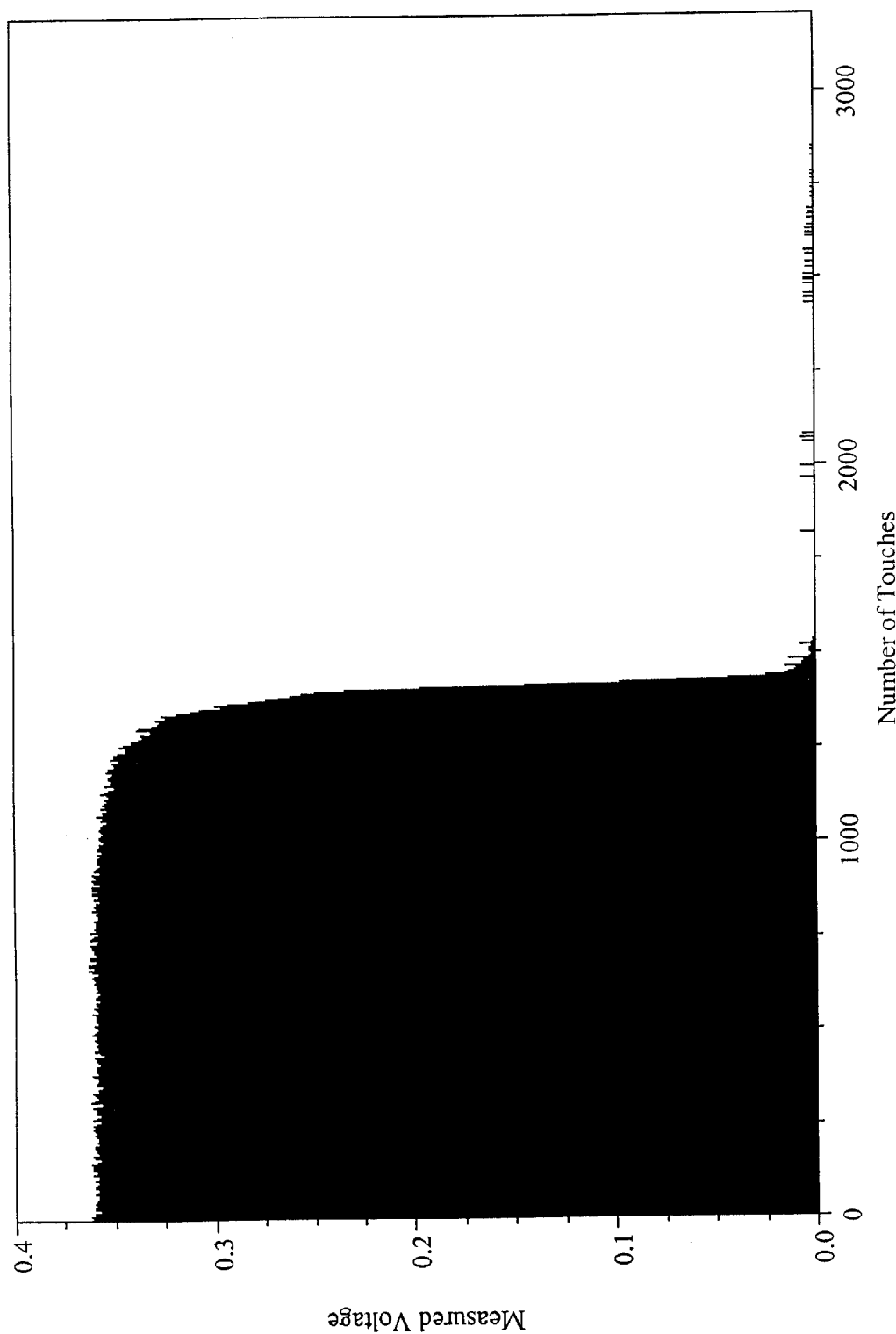

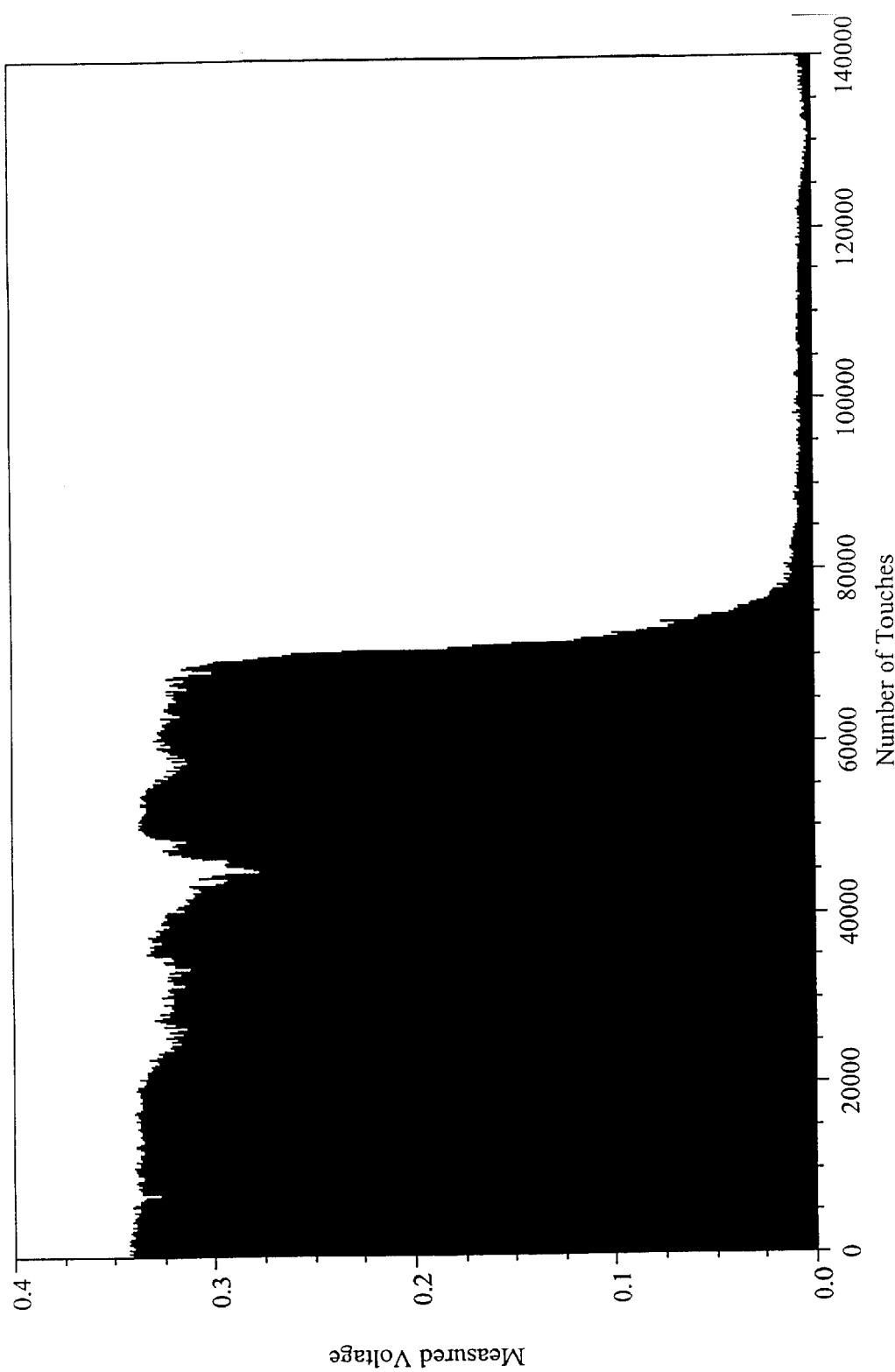

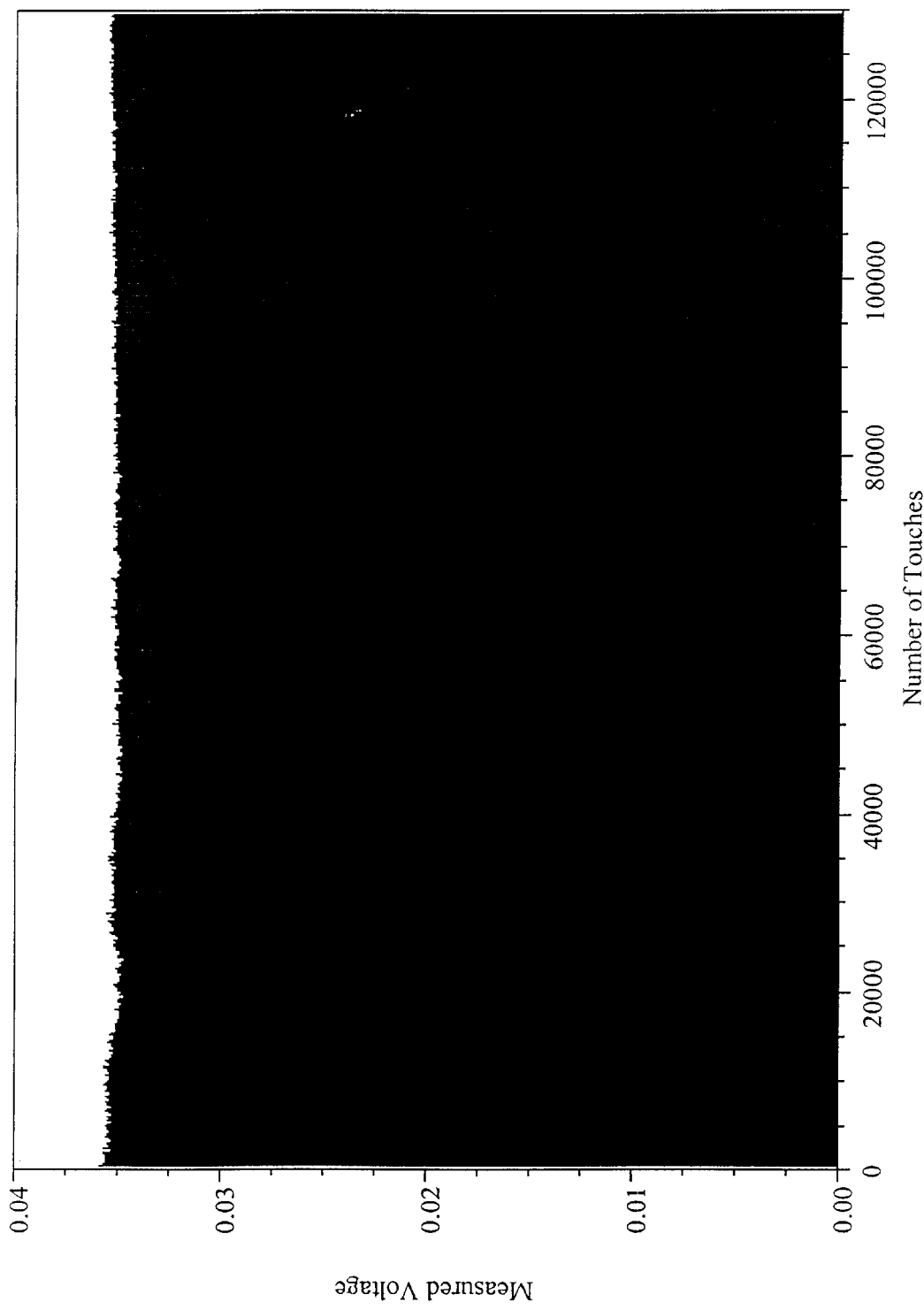
Figure 3a Coversheet POSITIVE Polarity (0.5 volts)

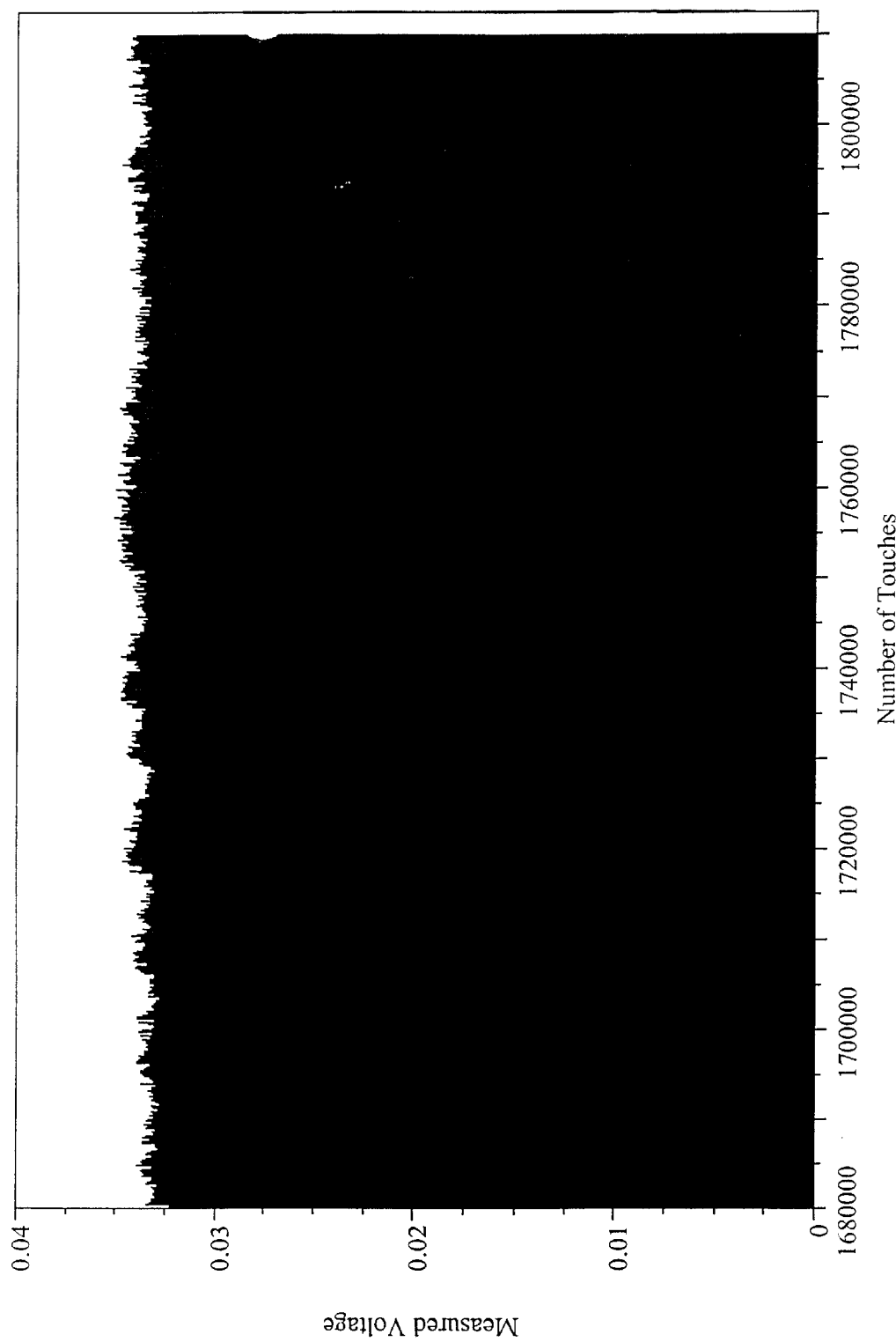
Figure 3b Coversheet POSITIVE Polarity (0.5 volts)

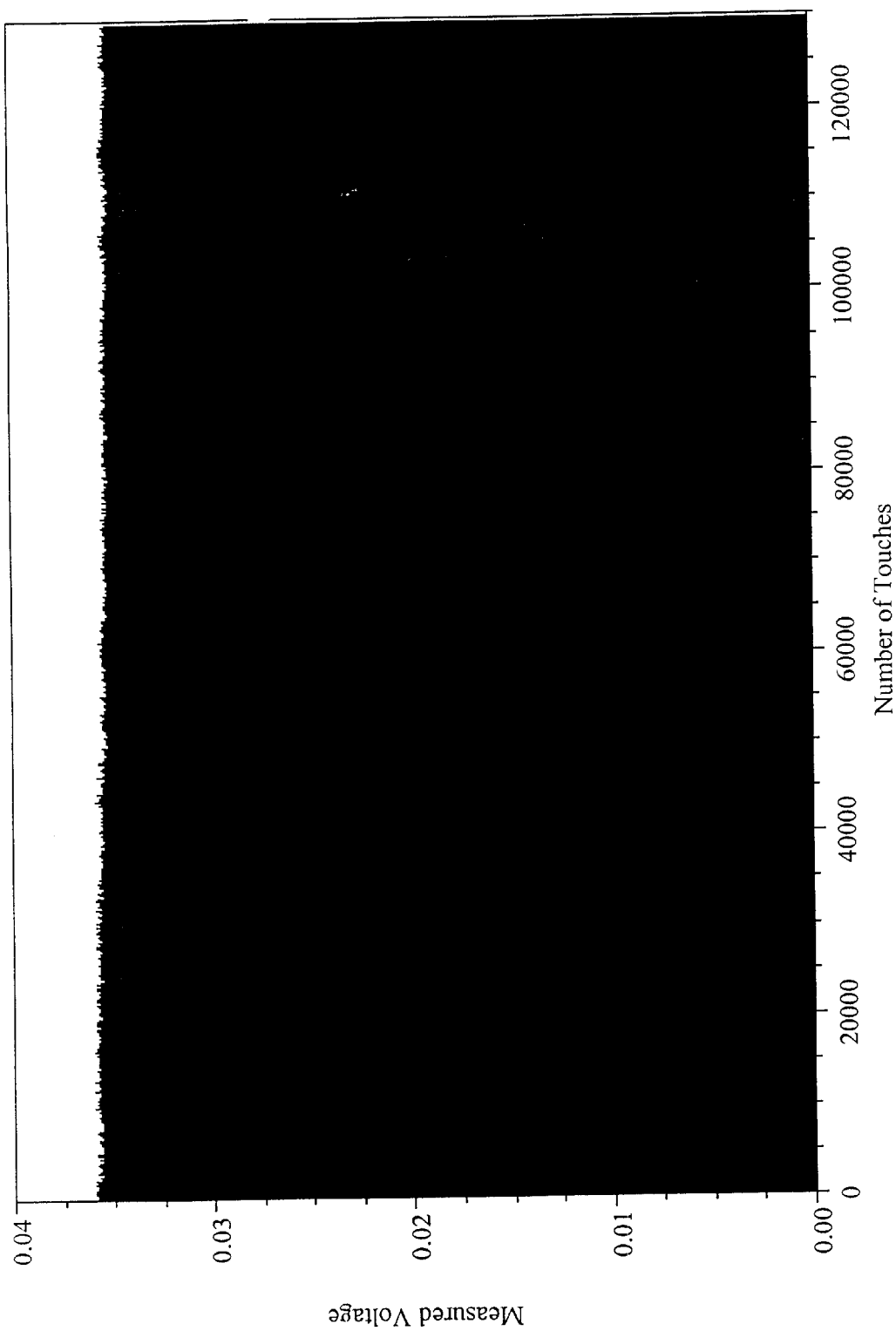
Figure 4a Coversheet NEGATIVE Polarity (0.5 volts)

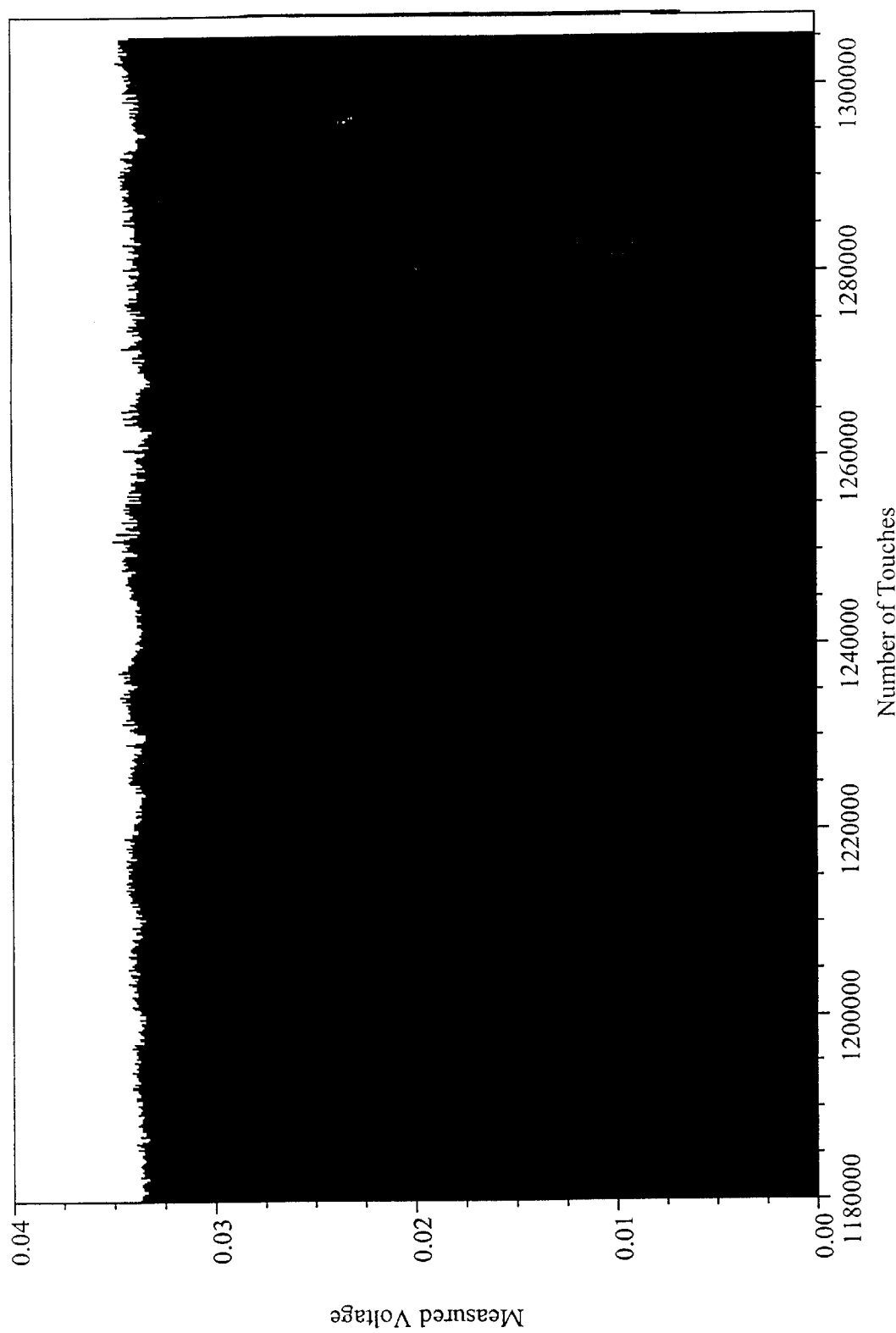
Figure 4b Coversheet NEGATIVE Polarity (0.5 volts)

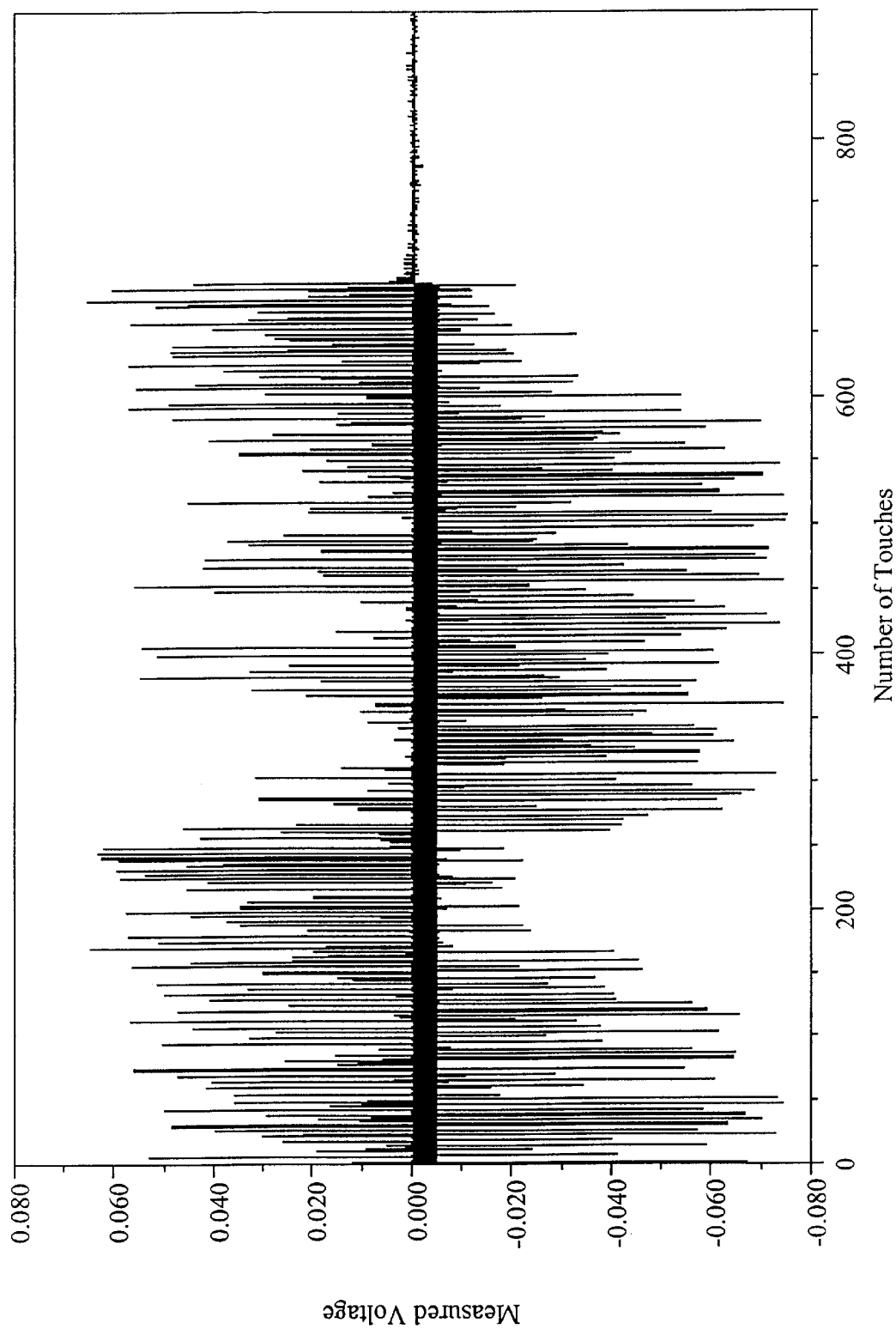

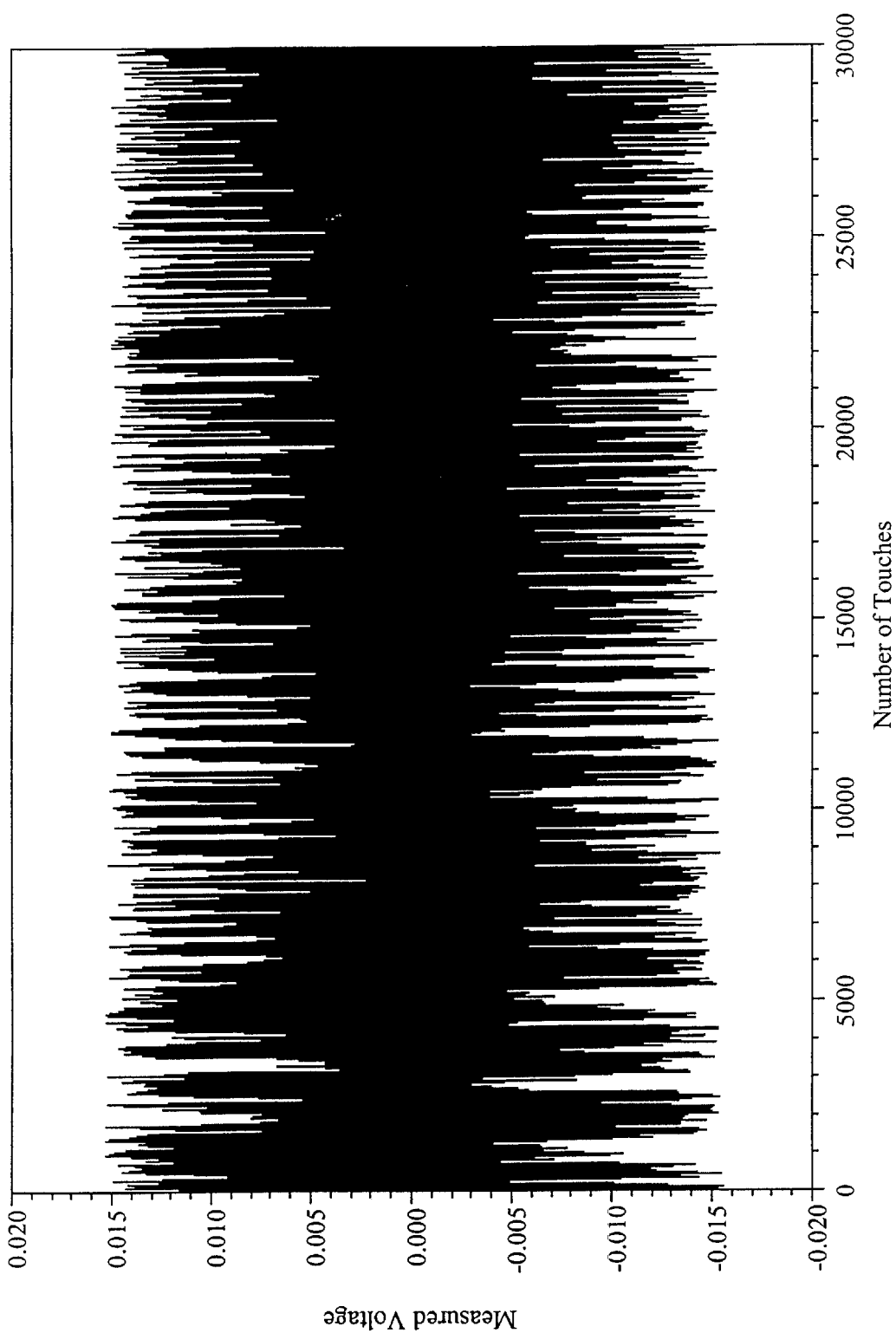
Figure 6 AC Voltage (0.5 volts; 60 cycles/sec)

SWITCH WITH AT LEAST ONE FLEXIBLE CONDUCTIVE MEMBER

BACKGROUND OF THE INVENTION

1. Field of the Invention

The present invention relates generally to switches. More specifically, the present invention relates to switches of the sort in which two conductive surfaces touch.

2. Description of the Related Art

Switches of the sort in which two conductive surfaces touch are used in such technologies as resistive touchscreens and membrane switches. For reasons of convenience and clarity, this background section describes resistive touchscreens.

Touchscreens are used in the computer arts to input data. Rather than a user of a computer inputting data by using a keyboard or a mouse, the user inputs data via a touchscreen mounted on the monitor of the computer. Several patents have been issued regarding resistive touchscreens, including U.S. Pat. Nos. 4,306,110; 5,438,168; 5,541,370; 5,589,857; 5,818,430; and 5,844,175. The basic configuration of a resistive touchscreen comprises a coversheet generally comprising a first substrate, and a second substrate to which the coversheet is bonded. The first substrate, i.e. the substrate of the coversheet, comprises a thin layer of a plastic, such as polyethylene terephthalate (PET). The first substrate has opposed first and second surfaces, the first surface facing a user of the computer and the second surface facing the second substrate. The second surface of the first substrate is coated with a conductive element. The second substrate is generally made of glass, although other transparent plastic materials could be used, and is either flat or curved to fit the curvature of a computer monitor. The second substrate is coated with a conductive element applied to a surface of the substrate facing the first substrate, and thus also facing a user of the computer.

The conductive elements typically are transparent conductive coatings of thin layers of metals or metal oxides such as indium tin oxide (ITO), although other metals or metal oxides could be used. The composition and application of ITO coatings are described in U.S. Pat. Nos. 5,776,373; 5,851,642; and 6,042,752.

The touchscreen also comprises a plurality of spacer dots applied to the conductive coating on one of the facing surfaces, either of the coversheet or of the substrate. Spacer dots are described in U.S. Pat. No. 5,220,136, although other spacer dots could also be used. These spacer dots separate the coversheet from the second substrate. Touching the coversheet presses the two conductive elements, one on the coversheet and one on the second substrate, together and thereby completes an electrical circuit that also comprises conductive elements such as wires on the edges of the conductive coatings. The specific location that is touched, and thus the location of the conductive elements that come into contact, is the data created and transmitted by the touch.

A problem with traditional touchscreens is the interrelationship between the mechanical properties of the substrate of the coversheet and the coating of the coversheet. The traditional materials used for the coating are generally brittle and can crack and disbond from the flexible plastic coversheet substrate when the substrate is deformed repeatedly. This in turn destroys the continuity of the electric current carrying pathways in the conductive coating, which in turn results in failure of the touchscreen to accurately report the location of a touch. What is needed is a transparent conductive coating that is flexible and durable and will bond to the coversheet substrate for the life of the touchscreen.

In addition to the aforementioned shortcomings of metal and metal oxide coatings, ITO coatings have a limited lifespan, i.e. they fail to transmit the requisite electrical current after a number of touches. ITO coatings are also relatively expensive and have low resistance to mechanical damage. What is needed is a transparent conductive coating that has a longer lifespan, a low cost, and is resistant to mechanical damage.

BRIEF SUMMARY

The present invention solves the above problems by changing both the material used in the transparent conductive coating on the coversheet and the electrical characteristics of the electrical circuit.

In a first improvement over traditional touchscreen technology, the present invention uses a layer of an intrinsically conductive polymer as the coating on the coversheet. Intrinsically conductive polymer coatings on flexible plastic coversheets are less brittle, more flexible, more resistant to mechanical damage, and available at lower cost than ITO coatings on plastic coversheets; further, by coating the plastic coversheet with an intrinsically conductive polymer coating rather than with a metallic coating, the coating does not crack or disbond from the substrate, and thus has a longer life.

Intrinsically conductive polymers known in the art include polyacetylene, polypyrrole, polyaniline, polythiophene, etc. More details about suitable intrinsically conductive polymers can be found in textbooks, such as "Advances in Synthetic Metals", ed. P. Bernier, S. Lefrant, and G. Bidan, Elsevier, 1999; "Intrinsically Conducting Polymers: An Emerging Technology", Kluwer (1993); "Conducting Polymer Fundamentals and Applications, A Practical Approach", P. Chandrasekhar, Kluwer, 1999; and "Handbook of Organic Conducting Molecules and Polymers", Ed. Walwa, Vol. 1–4, M. Dekker Inc. (1997).

In order to enjoy the benefits of the improved mechanical properties of intrinsically conductive polymer coatings over metal or metal oxide coatings, it has been discovered that it is necessary to carefully control the excitation of the electric circuit used with touchscreens incorporating intrinsically conductive polymers. This careful control of the excitation of the electric circuit is not required with conventional metal or metal oxide coatings such as ITO, and does not provide any additional advantage for these conventional materials.

In particular, both the level of the excitation voltage and the polarity of the voltage applied to the intrinsically conductive polymer coating must be carefully controlled to maximize the benefit of the improved mechanical properties of the intrinsically conductive polymer coatings. The excitation voltage of the touchscreen must be reduced from the 5 volts dc that is commonly used with many commercially available touchscreens. The same effect is observed with ac voltage. Additionally, the durability of the touchscreen is significantly improved when the intrinsically conductive polymer coating is held at a negative potential. These surprising effects are not observed with conventional metal or metal oxide coatings.

BRIEF DESCRIPTION OF THE DRAWING

FIG. 1 is a chart showing results of Experiment 1 performed with the test device of FIG. 8.

FIG. 2 is a chart showing results of Experiment 2 performed with the test device of FIG. 8.

FIG. 3a and FIG. 3b are charts showing results of Experiment 3 performed with the test device of FIG. 8.

FIG. 4a and FIG. 4b are charts showing results of Experiment 4 performed with the test device of FIG. 8.

FIG. 5 is a chart showing results of Experiment 5 performed with the test device of FIG. 8.

FIG. 6 is a chart showing results of Experiment 6 performed with the test device of FIG. 8.

DESCRIPTION OF THE PRESENTLY PREFERRED EMBODIMENTS

Figure 7:
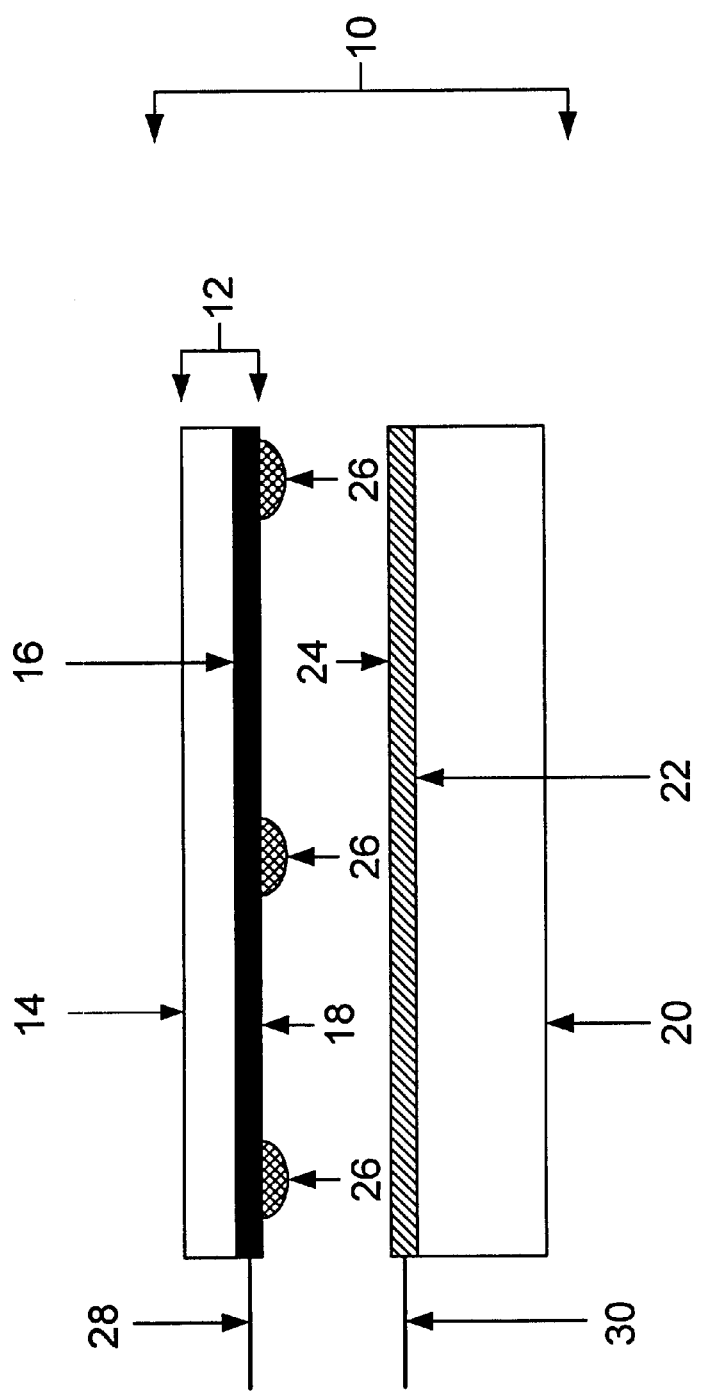
FIG. 7 is a schematic diagram of a touchscreen in accordance with the present invention.

As shown in FIG. 7, a switch 10 includes a coversheet 12 comprising a first substrate 14. The coversheet substrate 14 is, preferably, formed of a transparent plastic such as polyethylene terephthalate (PET), although other plastics having similar characteristics could be used. A first conductive coating 16 is disposed on the first substrate 14. The first conductive coating 16 has a surface 18 facing away from the first substrate 14. The first conductive coating 16 comprises an intrinsically conductive polymer and is substantially transparent. Intrinsically conductive polymers are described in U.S. Pat. No. 5,766,515, which is incorporated by reference.

The first conductive coating 16 is disposed on the first substrate 14 using a well-known coating method, e.g. by spin coating, dip coating, rod coating, blade coating, air knife coating, gravure coating, reverse roll coating, extrusion coating, slide coating and curtain coating. The coated solution is dried and cured using a well-known method. An overview of these coating techniques can be found in "Modem Coating and Drying Technology", Edward Cohen and Edgar B. Gutoff Editors, VCH Publishers, Inc, New York, N.Y., 1992. The conductive coating thus obtained has preferably a surface resistivity of less than 50000 $\Omega/\square$.

The switch 10 further comprises a second substrate 20. The second substrate 20 is, preferably, formed of transparent glass, although other transparent materials such as plastics could also be used. The second substrate 20 is flat, although it could also be curved to fit the curvature of a computer monitor screen (not shown). A second conductive coating 22 is disposed on the second substrate 20. The second conductive coating 22 has a surface 24 facing away from the second substrate 20 and toward the first conductive coating 16 and is spaced apart therefrom. The second conductive coating is made of indium tin oxide (ITO), though it could also be made of other metals or metal oxides or of an intrinsically conductive polymer, and is substantially transparent.

The first substrate 14 and the first conductive coating 16 are, preferably, transparent, i.e. each is characterized by a white light transmission of at least 80%, more preferably at least 90%, and most preferably at least 95%. When using the switch of the present invention as a component of a touchscreen, it is preferred that the first substrate 14, the second substrate 20, the first conductive coating 16, and the second conductive coating 22 are transparent, i.e. each is characterized by a white light transmission of at least 80%, more preferably at least 90% and most preferably at least 95%.

The switch 10 further comprises a plurality of spacer dots 26 of a type well known to the skilled artisan. The plurality of spacer dots 26 are disposed on the surface 18 of the first conductive coating 16, facing the surface 24 of the second conductive coating 22 and, preferably, spaced apart therefrom; alternatively, the spacer dots 26 could be disposed on the surface 24 of the second conductive coating 22 facing the surface 18 of the first conductive coating 16 and, preferably, spaced apart therefrom. Alternatively, the spacer dots 26 need not be spaced apart from the opposite surface. As is well-known to the skilled artisan, other elements, such as a scratch-resistant hardcoat layer applied to the outer surface of the coversheet (not shown), tie-layers between the coversheet plastic and conductive polymer layer to improve adhesion (not shown), and the like may also be used with the present invention.

The switch 10 further comprises a plurality of conductive elements electrically connected to the conductive coatings 16 and 22 to form an electrical circuit when the conductive coatings are in contact with each other. Wire 28 connects the first conductive coating 16 to a power source (not shown) within a computer monitor (not shown); similarly, wire 30 connects the second conductive coating 22 to a receiving medium (not shown) within the computer monitor (not shown). Many alternative configurations of conductive elements are possible, such as those described in U.S. Pat. Nos. 4,306,110; 5,438,168; 5,541,370; 5,589,857; 5,818,430; and 5,844,175; each of which is incorporated by reference.

The following experiments were performed to test the invention. The experiments were conducted using an equipment setup represented in FIG. 8. This setup was configured by modifying a standard 10.4-inch-display incorporating an AccuTouch> touchscreen, which is commercially available from Elo Touchsystems, Inc. of Fremont, Calif. The standard AccuTouch® touchscreen configuration includes a coversheet comprising a PET plastic substrate coated with a first transparent conductive coating made of ITO and a glass substrate coated with a second transparent conductive coating also made of ITO. The two layers of transparent conductive coating face each other and are spaced apart. Spacer dots are disposed on the coating of the coversheet, facing, but not touching, the coating of the glass screen.

The standard configuration described above was modified for these experiments by replacing the ITO of the first transparent conductive coating with a coating of an intrinsically conductive polymer. The particular intrinsically conductive polymer used was PEDOT, the chemical name of which is poly(ethylenedioxythiophene). The PEDOT was already bonded to a PET substrate in a 175-micrometer-thick coated film known as ORGACON-EL3TG, which is commercially available from Agfa-Gevaert N.V. of Antwerp, Belgium. PEDOT is described in U.S. Pat. No. 5,766,515, which is incorporated by reference.

Figure 8:
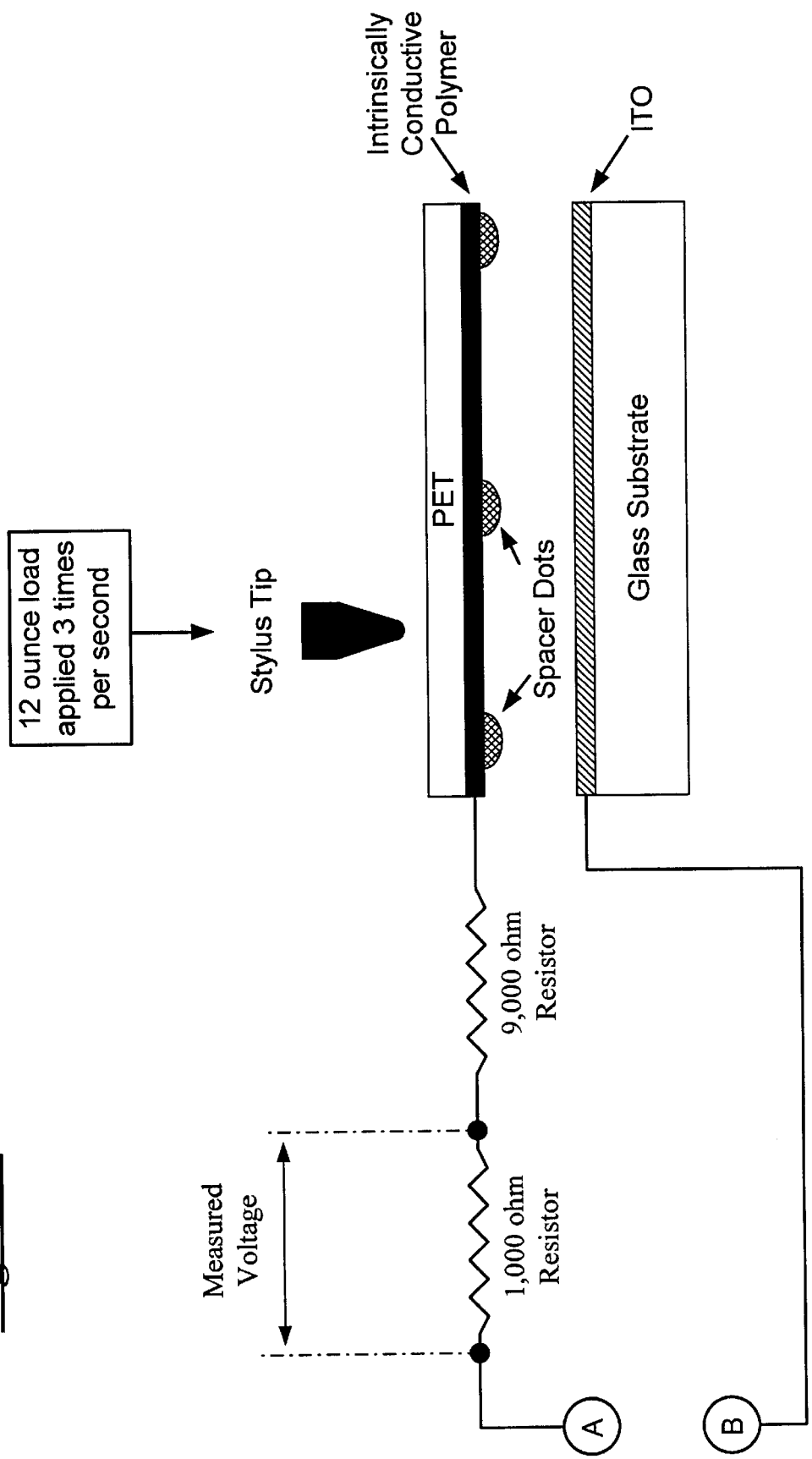
FIG. 8 is a schematic diagram of a circuit device used in accordance with the present invention.

A pneumatic piston was mounted above the substrate of the coversheet on the side opposite the coating and applied a load of twelve ounces to a stylus at a frequency of three times per second. The stylus was made from a hard plastic, specifically Cycolac T4500 ABS, which is commercially available from the General Electric Company. The tip radius of the stylus was 0.030 inches. The tip was carefully positioned to strike the substrate of the coversheet in the center of an area defined by four of the plurality of spacer dots. When the stylus tip struck the substrate, the conductive coatings on the coversheet and the substrate of the touchscreen were pressed into contact, thus completing the electrical circuit. A data acquisition system was used to continuously monitor the voltage drop across a 1000-ohm resistor located in series with the coating of the substrate as indicated in FIG. 8. The circuit also includes a pair of input terminals A and B.

Experiment 1

In this experiment a voltage potential of 5 volts dc was applied across the input terminals A and B; this voltage is commonly used in the touchscreen industry. The voltage of terminal A was positive with respect to terminal B, as taught in U.S. Pat. No. 5,766,515. If the electrical contact made by touching the coversheet and substrate into contact is degraded, the current flow during each contact will decrease and cause a decrease in the voltage drop across the series resistance.

Touchscreen failure can occur when the electrical contact is degraded to the extent that an appropriate electric circuit is not completed when the conductive surfaces are brought into contact. A fifty percent reduction in current, as indicated by a fifty percent decrease in the voltage drop across the series resistance, is a reasonable indication of touchscreen failure.

As shown in FIG. 1, a fifty percent reduction in voltage across the resistor was measured after approximately 1400 touches.

Experiment 2

In this experiment, a voltage potential of 5 volts dc was also applied across the input terminals A and B; however, the polarity, as compared to Experiment 1, was reversed, i.e. terminal A had a negative voltage with respect to terminal B. As shown in FIG. 2, a fifty percent reduction in voltage across the resistor was not measured until after approximately 80,000 touches, a 57-fold improvement compared to the number of touches to failure in Experiment 1.

Experiment 3

In this experiment, terminal A again had a positive voltage with respect to terminal B (similar to Experiment 1), but the voltage potential across the input terminals A and B was reduced from 5 volts dc to 0.5 volt dc. As shown in FIG. 3a, the voltage reduction across the resistor was negligible after approximately 130,000 touches. The experiment continued for more than 1.81 million touches. FIG. 3b shows that the voltage decrease across the last 120,000 touches of the test was only a few percent lower than the original voltage shown in FIG. 3a. A fifty percent reduction in voltage across the resistor was not measured during the entire experiment, which lasted for more than 1.81 million touches.

Experiment 4

In this experiment, terminal A again had a negative voltage with respect to terminal B (similar to Experiment 2), but the voltage potential across the input terminals A and B was reduced from 5 volts dc to 0.5 volt dc. As shown in FIGS. 4a and 4b, a fifty percent reduction in voltage across the resistor was not measured during the entire experiment, which lasted for more than 1.3 million touches.

As these experiments show, both reversing the polarity and reducing the dc voltage potential greatly increases the number of touches before the system fails. These results were surprising and unexpected.

Preliminary results show that an improved number of touches before failure are also obtained with voltage potentials of three volts and one volt. Experimentation continues.

Experiment 5

In this experiment, a 5 volt ac source operating at 60 cycles per second was coupled to the input terminals A and B. As shown in FIG. 5, after approximately 700 touches the voltage measured across the resistor was reduced by more than fifty percent.

Experiment 6

In this experiment, the ac voltage level was reduced from 5 volts to 0.5 volts. As shown in FIG. 6, a fifty percent reduction in voltage across the resistor was not measured during the entire experiment, which lasted for more than 30,000 touches.

As this experiment shows, reducing the ac voltage greatly increases the number of touches before the system fails. These results were surprising and unexpected.

As a practitioner of ordinary skill in the art will realize, the present invention is capable of many variations, including, but not limited to, all variations of resistive touchscreens and membrane switches. All such variations to the invention come within the scope of the present invention.

We claim:

1. A switch comprising:
    a coversheet comprising an intrinsically conductive polymer, and
    a substrate comprising a conductive surface, the substrate spaced apart from the coversheet,
    wherein movement of the coversheet into contact with the conductive surface of the substrate generates a signal indicative of said contact and wherein said coversheet has a polarity that is negative relative to the conductive surface of said substrate.

2. The switch of claim 1, wherein:
    a first terminal extends from the coversheet, and
    a second terminal extends from the conductive surface of the substrate,
    the first terminal, the coversheet, the conductive surface of the substrate, and the second terminal forming an electrical circuit such that the circuit is completed when movement of the coversheet brings the coversheet into contact with the conductive surface of the substrate.

3. The switch of claim 2, wherein an electrical potential of less than five volts is applied to the electrical circuit.

4. The switch of claim 2, wherein an electrical potential of less than one volt is applied to the electrical circuit.

5. The switch of claim 2, wherein an electrical potential of less than three volts is applied to the electrical circuit.

6. The switch of claim 5, wherein the electrical potential applied is direct current.

7. The switch of claim 5, wherein the electrical potential applied is alternating current.

8. The switch of claim 1, wherein the coversheet and the substrate are substantially transparent.

9. The switch of claim 1, wherein the intrinsically conductive polymer is poly(ethylenedioxythiophene).

10. A switch comprising:
    a coversheet comprising a first substrate and a first conductive coating applied to a first surface of the first substrate, the first conductive coating comprising an intrinsically conductive polymer; and a second substrate comprising a second conductive coating applied to a first surface of the second substrate,
    wherein the first and second substrates are positioned such that the first and second conductive coatings face each other and an electric potential of less than five volts is applied across the first and second conductive coatings and wherein the polarity of the first conductive coating is negative relative to the second conductive coating.

11. The switch of claim 10, wherein the intrinsically conductive polymer is poly(ethylenedioxythiophene).

12. A touchscreen comprising:
   a coversheet comprising a first substrate, the first substrate comprising a plastic;
   a second substrate spaced apart from the first substrate;
   a first conductive coating on the first substrate, the first conductive coating having opposed surfaces, one of the opposed surfaces of the first conductive coating facing the first substrate, the other of the opposed surfaces of the first conductive coating facing the second substrate, the first conductive coating comprising an intrinsically conductive polymer;
   a second conductive coating on the second substrate, the second conductive coating spaced apart from the first conductive coating, the second conductive coating having a surface facing the first conductive coating and spaced apart therefrom wherein the first conductive coating has a polarity that is negative relative to the second conductive coating; and
   a plurality of spacer dots,
   wherein:
      the plurality of spacer dots are disposed on the first conductive coating or the second conductive coating on the surface thereof facing the other of the conductive coatings, the spacer dots spaced apart from the other of the conductive coatings;
   a first terminal extends from the first conductive coating;
   a second terminal extends from the second conductive coating; and
   the first terminal, the first conductive coating, the second conductive coating, and the second terminal form an electrical circuit such that the electrical circuit is completed for transmission of an electrical signal to a receiving medium when the first conductive coating and the second conductive coating are pressed together.

13. The touchscreen of claim 12, wherein an electrical potential of less than three volts is applied to the electrical circuit.

14. The touchscreen of claim 12, wherein an electrical potential of less than one volt is applied to the electrical circuit.

15. The touchscreen of claim 12, wherein the first substrate, the second substrate, the first conductive coating, and the second conductive coating are substantially transparent.

16. The touchscreen of claim 12, wherein the intrinsically conductive polymer is poly(ethylenedioxythiophene).

17. The touchscreen of claim 12, wherein the second conductive coating comprises an intrinsically conductive polymer.

18. The touchscreen of claim 12, wherein an electrical potential of less than five volts is applied to the electrical circuit.

19. The touchscreen of claim 18, wherein the electrical potential applied is direct current.

20. The touchscreen of claim 18, wherein the electrical potential applied is alternating current.

* * * * *